United States Patent
Iwamoto (10) Patent No.: US 8,169,574 B2
(45) Date of Patent: May 1, 2012

(54) LIQUID CRYSTAL DISPLAY WITH VIEWING ANGLE COMPENSATORS

(75) Inventor: Yoshihisa Iwamoto, Yokohama (JP)

(73) Assignee: Stanley Electric Co., Ltd., Tokyo (JP)

( * ) Notice: Subject to any disclaimer, the term of this patent is extended or adjusted under 35 U.S.C. 154(b) by 462 days.

(21) Appl. No.: 12/533,255

(22) Filed: Jul. 31, 2009

(65) Prior Publication Data

US 2010/0026946 A1 Feb. 4, 2010

(30) Foreign Application Priority Data

Aug. 4, 2008 (JP) ................................. 2008-200873

(51) Int. Cl.
*G02F 1/1335* (2006.01)
*G02F 1/1333* (2006.01)

(52) U.S. Cl. .......... 349/119; 349/96; 349/117; 349/118; 349/120

(58) Field of Classification Search .................. 349/96, 349/117–120, 130
See application file for complete search history.

(56) References Cited

U.S. PATENT DOCUMENTS

| | | | |
|---|---|---|---|
| 4,889,412 A | 12/1989 | Clerc et al. | |
| 5,912,717 A | 6/1999 | Sugiyama et al. | |
| 6,281,956 B1* | 8/2001 | Ohmuro et al. | 349/118 |
| 6,339,460 B1 | 1/2002 | Saitoh | |
| 6,642,981 B1 | 11/2003 | Ohmuro et al. | |
| 6,724,452 B1 | 4/2004 | Takeda et al. | |
| 7,403,248 B2 | 7/2008 | Uchida et al. | |
| 2007/0046871 A1* | 3/2007 | Tasaka | 349/118 |
| 2007/0091236 A1* | 4/2007 | Yano et al. | 349/117 |
| 2007/0182895 A1* | 8/2007 | Fukagawa et al. | 349/117 |

FOREIGN PATENT DOCUMENTS

| | | |
|---|---|---|
| JP | 7-69536 B2 | 7/1995 |
| JP | 2872628 B2 | 1/1999 |
| JP | 2947350 B2 | 7/1999 |
| JP | 3299190 B2 | 4/2002 |
| JP | 3330574 B2 | 7/2002 |
| JP | 2005-234254 A | 9/2005 |
| JP | 3834304 B2 | 7/2006 |
| JP | 3863446 B2 | 10/2006 |

* cited by examiner

*Primary Examiner* — Hoan C Nguyen
(74) *Attorney, Agent, or Firm* — Holtz, Holtz, Goodman & Chick, PC (57) ABSTRACT

A liquid crystal display includes: a liquid crystal layer squeezed between first and second transparent substrates and vertically aligned at a retardation of 300 nm or larger to 940 nm or smaller; two or three viewing angle compensators disposed on the first transparent substrate on the side opposite to the liquid crystal layer, each of the viewing angle compensators having a retardation of 90 nm or larger to 350 nm or smaller in a thickness direction and a retardation of 5 nm or larger to 30 nm or smaller in an in-plane direction; a first polarizer disposed on the two or three viewing angle compensator; and a second polarizer disposed on the second transparent substrate and crossed-Nichol disposed relative to the first polarizer, wherein an in-plane slow axis of each viewing angle compensator is disposed perpendicular to an absorption axis of the first polarizer.

7 Claims, 11 Drawing Sheets

LIQUID CRYSTAL DISPLAY WITH VIEWING ANGLE COMPENSATORS

CROSS REFERENCE TO RELATED APPLICATION

This application is based on and claims priority of Japanese Patent Application JP2008-200873 filed on Aug. 4, 2008, the entire contents of which are incorporated herein by reference.

BACKGROUND OF THE INVENTION

A) Field of the Invention

The present invention relates to a liquid crystal display.

B) Description of the Related Art

A vehicle mount information display apparatus is desired to have a very low display luminance of a background display area and a dark display area in order to enhance expensive looking.

A display apparatus with a fluorescent display tube widely used conventionally has the disadvantages that glass substrates used for the display apparatus are thick and heavy, and in addition there is the problem that a special driving power source is used.

A liquid crystal display apparatus is light in weight and can use a vehicle mount power source as a driving power source. However, a conventional liquid crystal display apparatus has an insufficient contrast in front viewing and right/left viewing.

In this specification, a liquid crystal display apparatus is intended to mean a display apparatus constituted of a liquid crystal display for information display, a backlight equipped with an emission source, a driver circuit and a control circuit for controlling the operations of these components.

A normally black type liquid crystal display has been developed recently which uses an inorganic light emitting diode (LED) as a light source of a backlight to emit light generally at a single wavelength and increase a contrast dramatically only at this wavelength, and is used in a vehicle mount information display apparatus.

For a liquid crystal display capable of realizing good normally black display without depending upon an emission wavelength of a backlight, the structure is known in which a vertical alignment mode (VA mode) liquid crystal cell is disposed between approximately crossed-Nichol disposed polarizers. In the vertical alignment mode (VA mode), liquid crystal molecules in a liquid crystal layer formed between two upper and lower glass substrates are vertically or approximately vertically aligned relative to a substrate surface. As a liquid crystal display having the above-described structure is observed along a glass substrate normal direction, the optical characteristics are almost equal to the optical characteristics of crossed-Nichol disposed two polarizers. Namely, since an optical transmissivity becomes very low, it is possible to realize high contrast display relatively easily.

An invention of a liquid crystal display is disclosed (for example, refer to Japanese Patent No. 2047880) in which a viewing angle compensator (C plate) having negative uniaxial optical anisotropy or a viewing angle compensator (negative biaxial film) having negative biaxial optical anisotropy is inserted at one or both positions between the upper polarizer and upper glass substrate and between the lower polarizer and lower glass substrate. Even if the liquid crystal display is observed along an oblique direction, it is possible to suppress a rise in optical transmissivity and a fall in contrast so that good display is realized.

For this viewing angle compensation method, effective conditions have been proposed (for example, refer to Japanese Patent No. 3330574) for an in-plane retardation and an arrangement of an in-plane slow axis respectively of a negative biaxial film.

An invention of a liquid crystal display is disclosed (for example, refer to Japanese Patent No. 3299190) in which good viewing angle characteristics are obtained by using a combination of a wavelength plate of approximately a half wavelength having biaxial optical anisotropy, and a C plate. However, the liquid crystal display described in Japanese Patent No. 3299190 requires a constituent element of the wavelength plate of approximately a half wavelength for realizing a retardation of approximately a half wavelength in order to realize a retardation of approximately a half wavelength independently from an observation direction. It is therefore necessary in practical use to provide positive biaxial optical anisotropy so that it is difficult to realize this liquid crystal display.

An invention of a liquid crystal display is also well known (for example, refer to Japanese Patent No. 3863446) using a combination of a negative biaxial optical anisotropy and a C plate is also well known, instead of using the combination of the wavelength plate of approximately a half wavelength having biaxial optical anisotropy and the C plate as in the invention described in Japanese Patent No. 3299190. Japanese Patent No. 3863446 describes that an in-plane retardation of the biaxial film is 190 nm or smaller and a retardation of a liquid crystal layer of the liquid crystal cell used is 200 nm to 500 nm.

In order to acquire good viewing angle characteristics even during the application of voltage, multi domain alignment is effective in which liquid crystal molecules are oriented along a plurality of directions in one pixel. In order to realize this in a VA mode liquid crystal display, there are known an oblique electric field alignment control method (for example, refer to Japanese Patent No. 3834304) of devising the shape of an electrode to generate an electric field in a liquid crystal layer and control the alignment of liquid crystal molecules along the oblique electric field direction, and a liquid crystal molecule alignment control method (for example, refer to Japanese Patent No. 2947350) of controlling alignment by forming bank-shaped projections on the substrate surface.

If importance is attached to the viewing angle characteristics of a liquid crystal display in the right/left direction, it is possible to obtain good viewing angle characteristics by using a liquid crystal cell not of multi domain alignment but of mono domain alignment in which liquid crystal molecules are aligned in a uniform direction in the whole liquid crystal cell plane. It is possible to realize uniform mono domain alignment, for example, by a photo alignment method (for example, refer to Japanese Patent No 2872628) for a vertical alignment film and a rubbing method (for example, refer to Japanese Patent Laid-open Publication No. 2005-234254) for a vertical alignment film having special surface free energy.

If a VA mode liquid crystal display is multiplex driven at a duty of ¼ to ¹⁄₂₄₀, a retardation $\Delta$nd of the liquid crystal layer is required to be larger than at least 320 nm, more preferably larger than 360 nm. Unless sharpness of the electro optical characteristics is made as good as possible, it becomes difficult to maintain both the high contrast characteristics and a high optical transmittance during an on-voltage state in high duty driving, both being characteristic to the VA mode during high duty driving.

An optical film presently used for a liquid crystal display is a primary film manufactured in such a manner that raw resin is formed into a continuous film by a melting cast method or a melting extrude method and the continuous film is eventually wound around a roll. In order to develop a retardation in the primary film in an in-plane direction and a thickness direction, mainly a drawing process is executed. The drawing process is a process of drawing a primary film in a heated state along a roll winding direction (MD direction) and a direction TD (direction perpendicular to the MD direction) by a roll-to-roll method.

Many of resin films distributed in markets as negative biaxial films are formed by biaxially drawing a primary film having a thickness of about 0.2 mm or thinner and made of norbornene based cyclic olefin polymer (COP) along the MD and TD directions to develop an in-plane slow axis along the MD or TD direction.

An in-plane retardation Re (defined by Re=(nx−ny)×d where nx is an in-plane refractive index of a resin film in a lag phase axis direction, ny is an in-plane refractive index in an advance phase axis direction, and d is a film thickness) is larger than 0 nm and equal to or smaller than 300 nm, preferably larger than 4 nm and equal to or smaller than 300 nm, or more preferably larger than 30 nm and equal to or smaller than 300 nm. A retardation Rth in a thickness direction (defined by Rth=((nx+ny)/2−nz)×d where nz is a refractive index in the thickness direction) is equal to or smaller than 350 nm. If an Nz factor (defined by Nz=(nx−nz)/(nx−ny)) used as a ratio between a refractive index in the in-plane direction to that in the thickness direction does not satisfy the condition that the factor is larger than 1 and smaller than 56, more preferably larger than 1 and smaller than 12, it can be considered that realizing in-plane uniformity of Re and Rth is difficult.

A thickness of a film after the drawing process is about several tens μm. Material of a base film of a polarizer having essentially the optical characteristics of a C plate and a protective film has been improved by using, as a base, triacethyl cellulose (TAC) used by these films. This material is subjected to the drawing process to develop an in-plane slow axis along the MD or TD direction, and negative biaxial optical films formed in this manner are also sold in markets. An in-plane retardation Re of this film has a narrower range than that of norbornene based COP, and is about 40 to 70 nm. A retardation Rth in the thickness direction is 120 nm or lager to 220 nm or smaller.

If the invention described in Japanese Patent No. 3330574 is reduced in practice by disposing a commercially available negative biaxial film only between the liquid crystal cell and one polarizer, a retardation Δnd of the liquid crystal layer is smaller than about 500 nm. If a negative biaxial film is disposed between the liquid crystal cell and both the polarizers, a retardation Δnd of the liquid crystal layer is smaller than about 850 nm.

However, as will be described later with reference to comparative examples, if the liquid crystal layer of a liquid crystal display having the structure that a viewing angle compensator is disposed between the liquid crystal cell and both polarizers has a large retardation Δnd, there appears the phenomenon that display is hardly visually recognized along the right/left direction during bright display at a large polar observation angle, particularly at an angle larger than 45°. Therefore, in order to obtain good display quality under the condition that a retardation Δnd is large, i.e., under the driving condition of a large duty ratio, it is considered effective to use a method of disposing a biaxial film between the liquid crystal cell and one polarizer or a method of laminating a negative biaxial film and a C plate as described in Japanese Patent No. 3863446.

However, the former method is effective only for a retardation Δnd to about 500 nm and it is also difficult to realize good display characteristics during high duty driving. The latter method requires an expensive C plate so that a manufacture cost of a liquid crystal display is raised.

SUMMARY OF THE INVENTION

An object of the present invention is to provide a liquid crystal display capable of realizing good display.

According to one aspect of the present invention, there is provided a liquid crystal display including: first and second transparent substrates; a liquid crystal layer squeezed between the first and second transparent substrates and vertically aligned at a retardation of 300 nm or larger to 940 nm or smaller; two or three viewing angle compensators disposed on the first transparent substrate on the side opposite to the liquid crystal layer, each of the viewing angle compensators having a retardation of 90 nm or larger to 350 nm or smaller in a thickness direction and a retardation of 5 nm or larger to 30 nm or smaller in an in-plane direction; a first polarizer disposed on the two or three viewing angle compensator on the side opposite to the first transparent substrate; and a second polarizer disposed on the second transparent substrate on the side opposite to the liquid crystal layer and crossed-Nichol disposed relative to the first polarizer, wherein an in-plane slow axis of each viewing angle compensator is disposed perpendicular to an absorption axis of the first polarizer.

According to the present invention, it is possible to provide a liquid crystal display capable or realizing good display.

DESCRIPTION OF THE PREFERRED EMBODIMENT

Prior to making detailed description of liquid crystal displays of an embodiment and comparative examples, the outline of the liquid crystal displays and their manufacture method will be given.

In manufacturing liquid crystal displays of the embodiment and comparative examples, a vertical alignment film was formed on a glass substrate having transparent electrodes (ITO electrodes) of a predetermined pattern formed on glass, by using material manufactured by Chisso Petrochemical Corporation. Thereafter, the substrate was subjected to an alignment process of the rubbing method described in Japanese Patent Laid-open Publication No. 2005-234254. An insulating film such as $SiO_2$ may be formed between the glass substrate and alignment film.

Two substrates subjected to the alignment process were bonded with a sealing member, with the two alignment films being set in proximity and the rubbing directions being set anti-parallel.

While the substrates are bonded, a distance between the substrates is adjusted by a spherical spacer to set a distance of, e.g., 2 to 6 µm.

Liquid crystal material having a birefringence anisotropy $\Delta n$ of 0.08 or higher to 0.26 or lower and a negative dielectric constant anisotropy $\Delta \in$ was injected between the bonded two glass substrates, and thereafter the liquid crystal layer was cured for one hour at a temperature higher by about 20° C. than an isotropic phase temperature. A pretilt angle of liquid crystal molecules in the liquid crystal cell of the liquid crystal display of the embodiment and comparative examples was about 89.9° independently from the values of $\Delta n$ and $\Delta \in$.

Polarizers were adhered to the outsides of two glass substrates of the liquid crystal cell, with the absorption axes of the polarizers approximately crossed-Nichol disposed. SHC13U manufactured by Polatechno Co. Ltd was used as the polarizer. A TAC base film having an in-plane retardation Re of about 3 to 5 nm exists on the adhesion plane of the polarizer on the glass substrate side, and bonded to the polarizing layer with adhesive agent. In simulation analysis, the in-plane retardation Re of the TAC base film was set to 3 nm, and the thickness direction retardation Rth was set to 50 nm.

A norbornene based COP film biaxially drawn was used as a negative biaxial film disposed between the glass substrate of the liquid crystal cell and the polarizer.

"LCDMASTER6.16" manufactured by SHINTECH, Inc. was used for simulation analysis.

Figure 1:
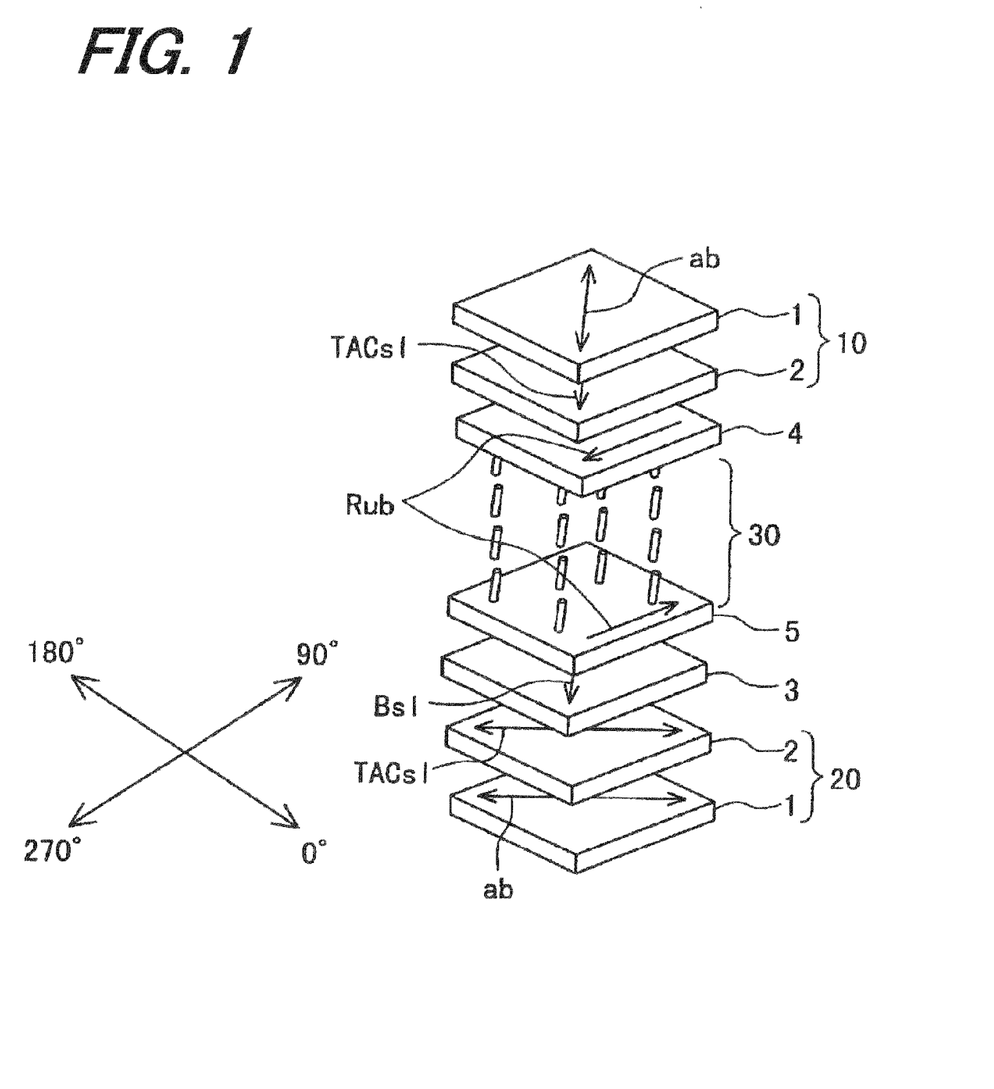
FIG. 1 is a schematic diagram illustrating a liquid crystal display according to a first comparative example.
Figure 2:
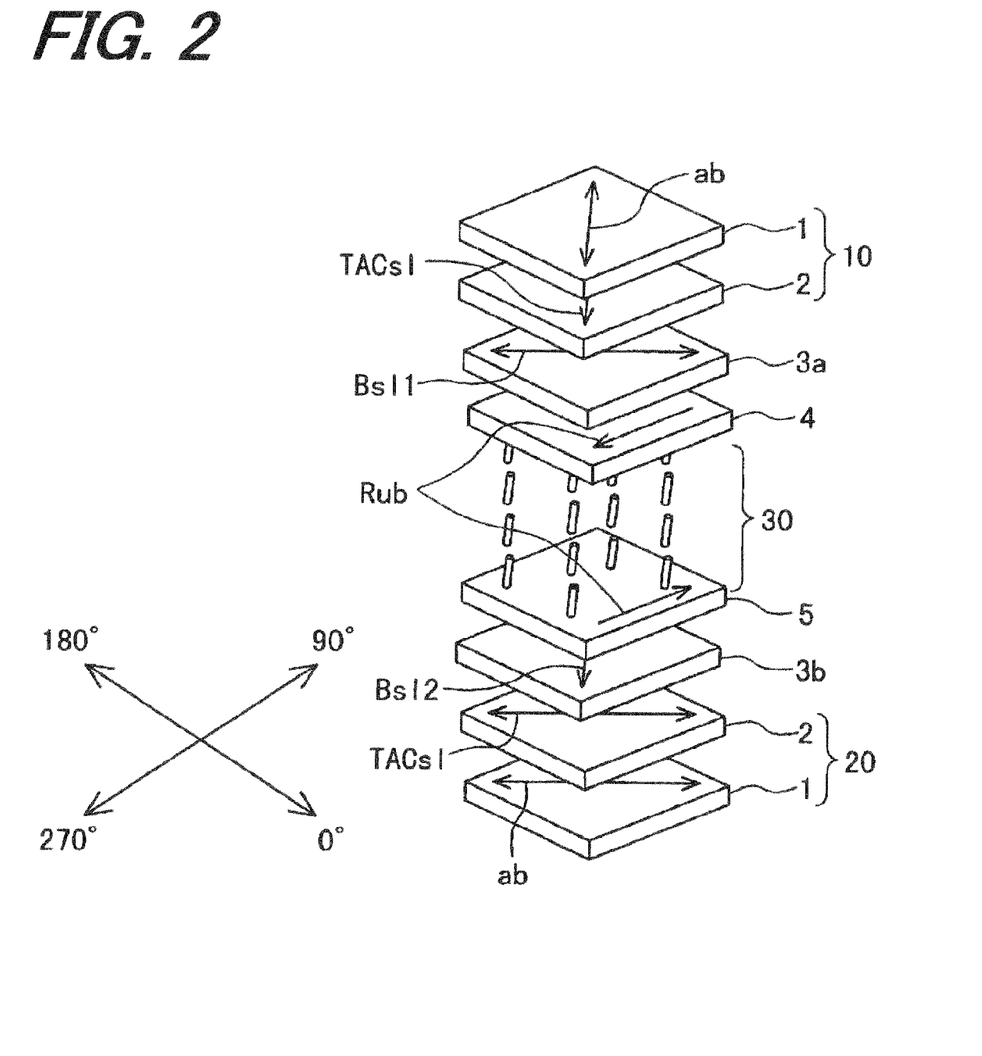
FIG. 2 is a schematic diagram illustrating a liquid crystal display according to a second comparative example.
Figure 3:
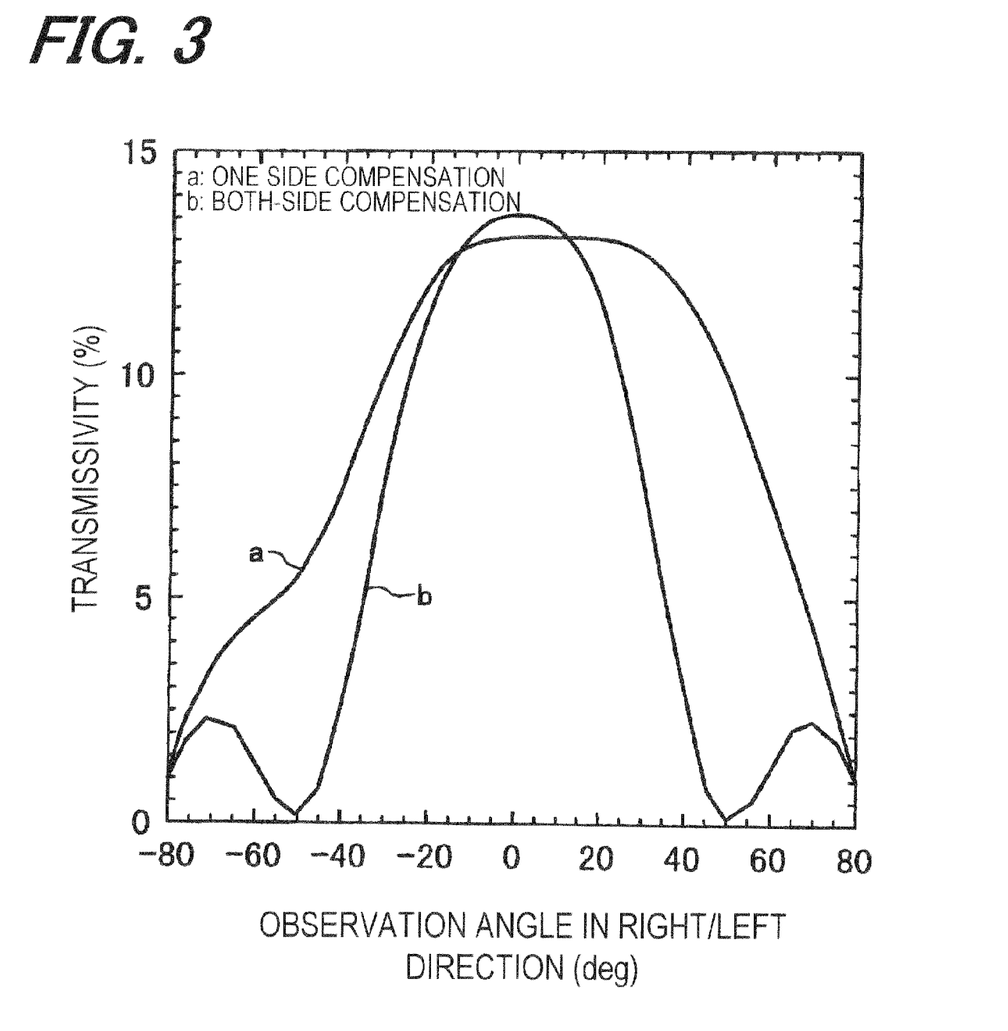
FIG. 3 is a graph illustrating the viewing angle characteristics in right/left observation of the liquid crystal display (one side compensation) of the first comparative example and the liquid crystal display (both-side compensation) of the second comparative example.

With reference to FIGS. 1 to 3, description will be made on simulation analysis of viewing angle characteristics during bright display of a liquid crystal display of comparative examples.

FIG. 1 is a schematic diagram illustrating a liquid crystal display of the first comparative example.

Between a front (upper) polarizer 10 and a rear (lower) polarizer 20 crossed-Nichol disposed, a mono domain vertical alignment liquid crystal cell is disposed The mono domain vertical alignment liquid crystal cell is constituted of an upper glass substrate (transparent substrate) 4, a lower glass substrate (transparent electrode) 5 and a mono domain vertical alignment liquid crystal layer 30 squeezed between both substrates 4 and 5. A single negative biaxial film 3 is disposed between the lower glass substrate 5 of the liquid crystal cell and the rear polarizer 20.

The front and rear polarizers 10 and 20 each have the structure that a polarizing layer 1 is disposed on a TAC base film 2. Although omitted in the drawing, a surface protective film made of TAC is disposed on the polarizing layer 1.

n the directional coordinate system shown wherein a right/left direction of the liquid crystal display is defined as a 180°-0° (9 o'clock-3 o'clock) direction, a rubbing direction Rub of the upper glass substrate 4 is 270°, a rubbing direction Rub of the lower glass substrate 5 is 90° and an alignment direction of central molecules in the liquid crystal layer 30 is 90° (12 o'clock) An absorption axis ab of the polarizer layer 1 and an in-plane slow axis TACsl of the base film 2 of the front polarizer 10 are set along the 135° direction, and those of the rear polarizer 20 are set along the 45° direction. Since an in-plane slow axis Bsl of the negative biaxial film 3 is disposed approximately perpendicular to the absorption axis of the adjacent polarizer, the direction thereof is 135°. An in-plane retardation Re of the negative biaxial film 3 was set to 50 nm, and a thickness direction retardation Rth thereof was set to 300 nm.

Simulation analysis of the liquid crystal display of the first comparative example indicated that a retardation $\Delta nd$ of the liquid crystal layer 30 was about 465 nm at which optimum viewing angle characteristics during no voltage application (background) were obtained.

FIG. 2 is a schematic diagram illustrating a liquid crystal display of the second comparative example. In the first comparative example, a single negative biaxial film is disposed between the lower glass substrate 5 of the liquid crystal cell and the rear polarizer 20. In the second comparative example, a first negative biaxial film 3a is disposed between the upper glass substrate 4 of the liquid crystal cell and the front polarizer 10, and a second negative biaxial film 3b is disposed between the lower glass substrate 5 of the liquid crystal cell and the rear polarizer 20. Other structures are similar to those of the first comparative example.

Since an in-plane slow axis Bsl1 of the first negative biaxial film 3a is disposed approximately perpendicular to the absorption axis ab of the adjacent polarizer 10, the direction thereof is 45°. Since an in-plane retardation Bsl2 of the second negative biaxial film 3b is disposed approximately perpendicular to the absorption axis ab of the polarizing layer 1 of the adjacent polarizer 20, the direction thereof is 135°.

The in-plane retardations Re of the first and second negative biaxial films 3a and 3b were both set to 20 nm, and the thickness direction retardations Rth thereof were both set to 300 nm.

Simulation analysis of the liquid crystal display of the second comparative example indicated that a retardation $\Delta nd$ of the liquid crystal layer 30 was about 825 nm at which optimum viewing angle characteristics during no voltage application (background) were obtained.

The present inventor calculated viewing angle characteristics in right/left observation of the liquid crystal displays of the first and second comparative examples, by adjusting a drive voltage so as to obtain an optical transmissivity of about 13 to 14% in front observation.

FIG. 3 is a graph illustrating the viewing angle characteristics in right/left observation of the liquid crystal display (one side compensation) of the first comparative example and the liquid crystal display (both-side compensation) of the second comparative example.

The abscissa of the graph represents an observation angle in the right/left direction in the unit of "°", and the ordinate represents an optical transmittance in the unit of "%". A curve a illustrates the viewing angle characteristics in right/left observation of the liquid crystal display (one side compensation) of the first comparative example, and a curve b illustrates the viewing angle characteristics in right/left observation of the liquid crystal display (both-side compensation).

It is possible to understand from the curve a that although the liquid crystal display (both-side compensation) of the second comparative example has a symmetrical optical transmissivity in the right and left, the optical transmissivity becomes very low at a right/left observation angle of 45° or larger.

In a liquid crystal display of the second comparative example actually manufactured, display was hardly visually recognized at the right/left observation angle of 45° or larger. Also in the liquid crystal display of the second comparative example actually manufactured, a color shift phenomenon was observed remarkably, changing the color tone in bright display considerably as an observation angle is made deeper.

This may be ascribed to that if a retardation Δnd is large to some extent and a liquid crystal display having the structure of the second comparative example is observed at a large angle along a direction shifted by 45° from the polarizer absorption axis, reduction in an optical transmissivity and a color shift become large.

The present inventor has studied a change in retardation Δnd by adjusting the in-plane retardations Re and thickness direction retardations Rth of the two negative biaxial films 3a and 3b. It has been confirmed from these studies that a similar phenomenon occurs in a range of Δnd≧500 nm.

On the other hand, it is possible to understand from the curve b that although the liquid crystal display (one side compensation) of the first comparative example has an asymmetrical optical transmissive in the right and left, a reduction in optical transmissivity is not so severe as in the case of the second comparative example, even at a large observation angle.

In a liquid crystal display of the first comparative example actually manufactured, it did not occur that display was hardly recognized at a large observation angle. Also in the liquid crystal display of the first comparative example actually manufactured, a color shift phenomenon was observed hardly.

It is judged therefore that the viewing angle characteristics in bright display of the first comparative example are better than those of the second comparative example. However, a thickness direction retardation Rth of a commercially available negative biaxial film is compatible with a retardation Δnd of about 500 nm at most. It is therefore judged that even the liquid crystal display of the first comparative example is difficult to realize good display characteristics in high duty driving, particularly at a duty of 1/32 or higher.

Figure 4:
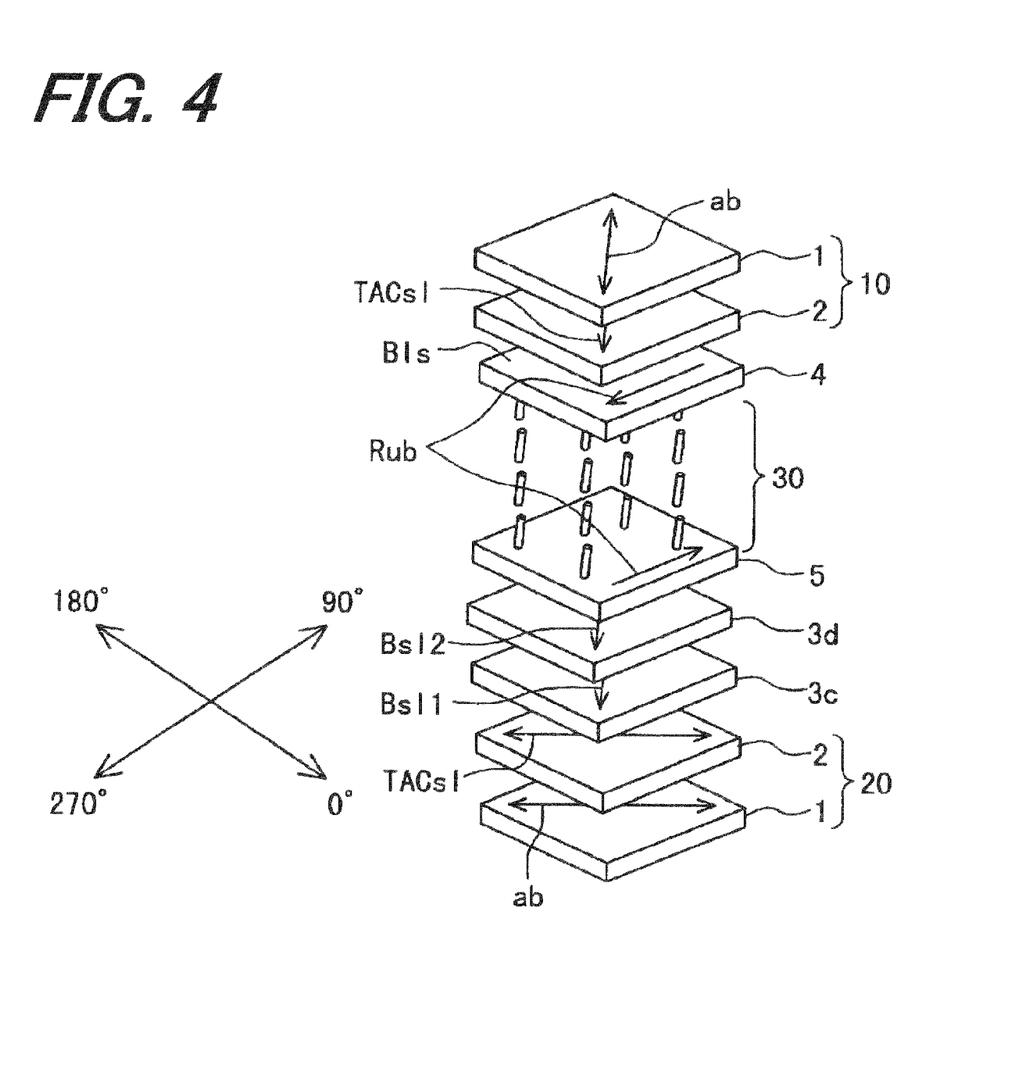
FIG. 4 is a schematic diagram illustrating a liquid crystal display according to an embodiment.

FIG. 4 is a schematic diagram illustrating a liquid crystal display according to an embodiment.

A vertical alignment liquid crystal cell having a liquid crystal layer approximately vertically aligned relative to an upper glass substrate 4 and a lower glass substrate 5 is disposed between a front (upper) polarizer 10 and a rear (lower) polarizer 20 crossed-Nichol disposed. A first biaxial film 3c and a second biaxial film 3d are laminated and disposed between the lower glass substrate 5 of the liquid crystal cell and the rear polarizer 20.

The front and rear polarizers 10 and 20 each have the structure that a polarizing layer 1 is disposed on a TAC base film 2. Although omitted in the drawing, a surface protective film made of TAC is disposed on the polarizing layer 1.

A rubbing direction Rub of the upper glass substrate 4 is 270°, a rubbing direction Rub of the lower glass substrate 5 is 90° and an alignment direction of central molecules in the liquid crystal layer 30 is 90° (12 o'clock). An absorption axis ab of the polarizer layer 1 and an in-plane slow axis TACsl of the TAC base film 2 of the front polarizer 10 are set along the 135° direction, and those of the rear polarizer 20 are set along the 45° direction.

It is preferable to dispose in-plane slow axes Bsl1 and Bsl2 of the first and second negative biaxial films 3c and 3d, approximately perpendicular to the absorption axis ab of the adjacent rear polarizer 20. Therefore, for example, the in-plane slow axes Bsl1 and Bsl2 are set along the 135° direction.

The present inventor has conducted simulation analysis regarding obtaining good optical parameters of the first and second negative biaxial films 3c and 3d of the liquid crystal display of the embodiment.

Studies were made first on the case in which the optical parameters of the first and second negative biaxial films 3c and 3d are equal. The background viewing angle characteristics in the right/left direction of the embodiment liquid crystal display were calculated by fixing the thickness direction retardations Rth of the first and second negative biaxial films 3c and 3d to 300 nm and changing the in-plane retardation Re.

The background viewing angle characteristics in the right/left direction were calculated for each of the in-plane retardations Re of 50 nm, 40 nm, 30 nm, 25 nm, 20 nm, 15 nm and 10 nm. For these calculations, a retardation Δnd of the liquid crystal layer was set to an optimum value for each Re.

More specifically, the calculations were made by setting a retardation Δnd to 840 nm for the in-plane retardations Re of 50 nm and 40 nm, to 825 nm for Re of 30 nm and 25 nm, and to 810 nm or Re of 20 nm 15 nm and 10 nm.

Figure 5:
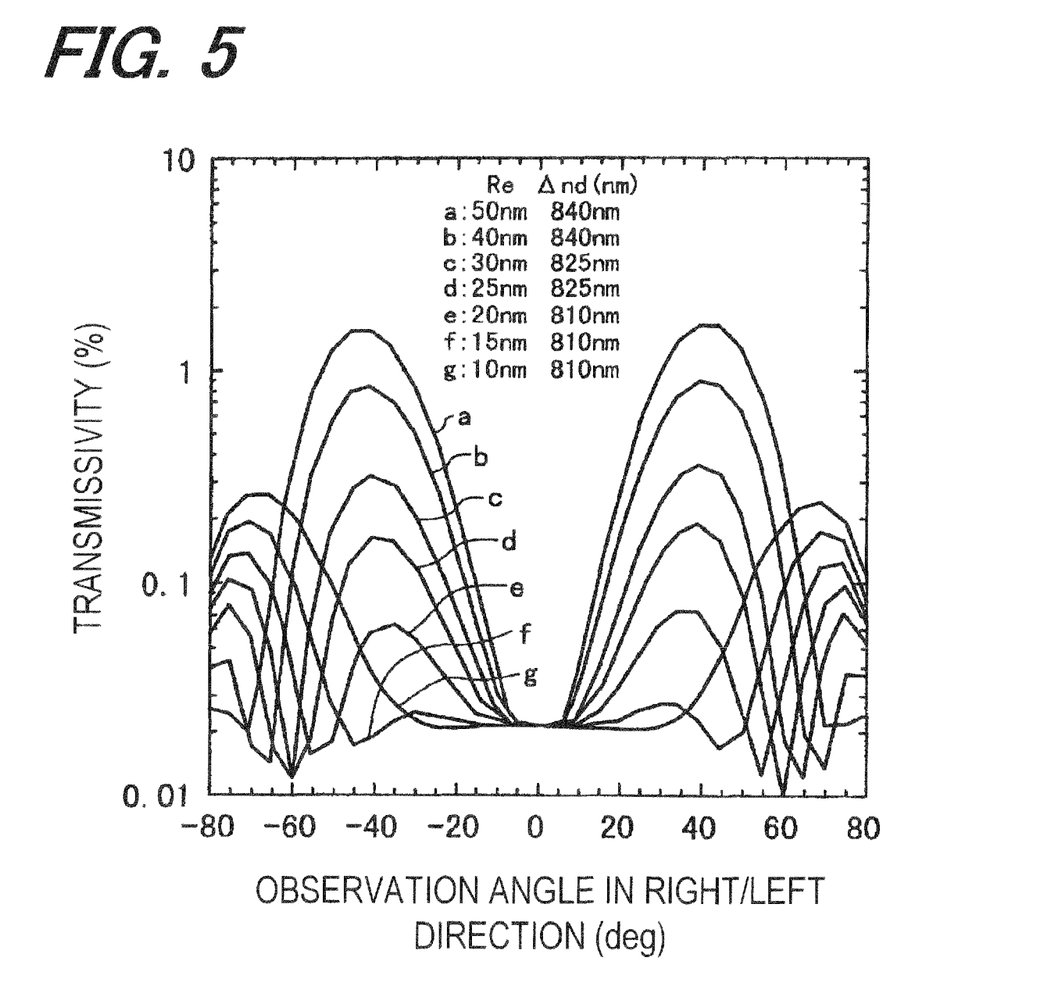
FIG. 5 is a graph illustrating simulation analysis results

FIG. 5 is a graph illustrating simulation analysis results. The abscissa of the graph represents an observation angle in the right/left direction in a linear scale and in the unit of "°", and the ordinate represents an optical transmissivity in a logarithmic scale and in the unit of "%". Curves a, b, c, d, e, f and g indicate viewing angle characteristics in the right/left direction at the in-plane retardations Re of, 50 nm, 40 nm, 30 nm, 25 nm, 20 nm, 15 nm and 10 nm, respectively in this order.

Under a condition of a large in-plane retardation Re, there is the tendency that an optical transmissivity becomes large at a large observation angle. Optical transmittance tends to become large near at an observation angle of 30° to 45°. By paying attention to an optical transmissivity at an observation angle of 45° (±45°) in the right/left direction, the optical transmissivity is smallest at an in-plane retardation Re of 15 nm.

The present inventor has studied also the case in which the thickness direction retardations Rth of the first and second negative biaxial films 3c and 3d are other than 300 nm. An Re dependency of an optical transmissivity Re in observation along a 45° right direction was calculated for each of retardations Rth of 90 nm, 220 nm and 350 nm. For calculations, the retardation Δnd of the liquid crystal layer at a thickness direction retardation Rth of 90 nm was set to 360 nm. The retardations Δnd at the thickness direction retardations Rth of 220 nm and 350 nm were set to 630 nm and 890 nm, respectively.

Figure 6:
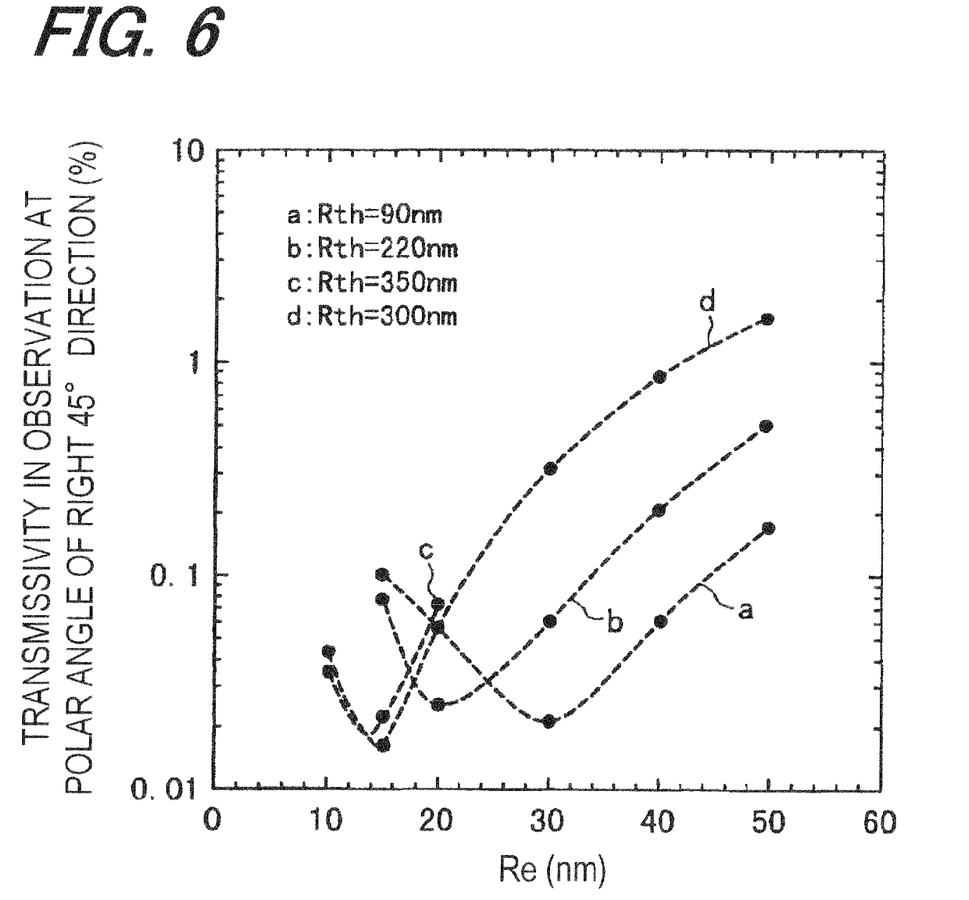
FIG. 6 is a graph illustrating an inplane retardation Re dependency of an optical transmissivity during 45° right direction observation at each retardation Rth in the thickness direction.

FIG. 6 is a graph illustrating an in-plane retardation Re dependency of an optical transmissivity in observation along a 45° right direction at each of the thickness direction retardations Rth.

The abscissa of the graph represents an in-plane retardation Re of the first and second negative biaxial films 3c and 3d in a linear scale and in the unit of "nm", and the ordinate represents an optical transmissivity in observation along a right 45° direction in a logarithmic scale and in the unit of "%". Curves a, b, c and d indicate the relations at the thickness retardations Rth of 90 nm, 220 nm, 350 nm and 300 nm, respectively in this order.

It can be understood that an optimum in-plane retardation Re changes with a value of the thickness direction retardation Rth. It is recognized that there is the tendency that the optimum in-plane retardation Re reduces as the value of the thickness direction retardation Rth becomes large. It is expected from this graph that good viewing angle characteristics are obtained if the thickness direction retardation Rth is in a range of 90 nm≦Rth≦350 nm and the in-plane retardation Re is in a range of 5 nm≦Re≦30 nm. It can be considered that good display quality is obtained in high duty driving, e.g., at a duty of 1/16 or higher, if the ranges are 220 nm≦Rth≦350 nm and 5 nm≦Re≦25 nm, more preferably 7 nm<Rth≦20 nm.

The present inventor has studied viewing angle characteristics in the right/left direction of liquid crystal displays having the in-plane retardation Re of the first and second negative biaxial films 3c and 3d and the thickness direction retardation Rth, respectively in the ranges described above.

Figure 7:
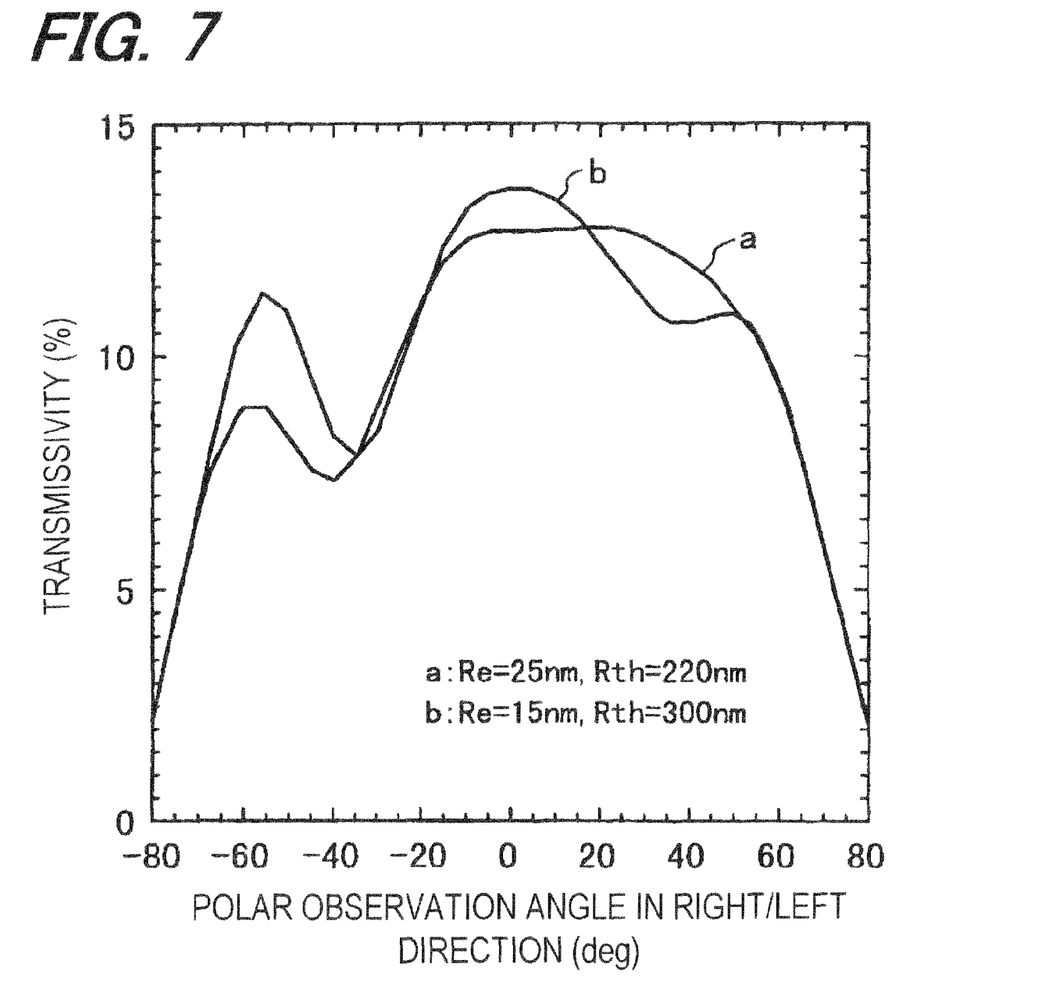
FIG. 7 is a graph illustrating right/left direction viewing angle characteristics, during bright display at an optical transmissivity of 13 to 14%, of a liquid crystal display having Re=25 nm, Rth=220 nm and Δnd=630 nm and a liquid crystal display having Re=15 nm, Rth=300 nm and Δnd=825 nm.

FIG. 7 is a graph illustrating viewing angle characteristics in the right left direction in bright display with an optical transmissivity being set to 13 to 14%, of a liquid crystal display with Re=25 nm, Rth=220 nm and a liquid crystal layer retardation Δnd=630 nm, and of a liquid crystal display with Re=15 nm, Rth=300 nm and a liquid crystal layer retardation Δnd=825 nm.

The abscissa of the graph represents an observation angle in the right left direction in the unit of "°", and the ordinate represents an optical transmissivity in the unit of "%". A curve a indicates the viewing angle characteristics in the right/left direction of the liquid crystal display with Re=25 nm, Rth=220 nm and a liquid crystal layer retardation Δnd=630 nm, and a curve b indicates the viewing angle characteristics in the right/left direction of the liquid crystal display with Re=15 nm, Rth=300 nm and a liquid crystal layer retardation Δnd=825 nm.

It is possible to confirm from the graph that both the liquid crystal displays realize a high optical transmissivity including observation at a large angle of 45° or larger. Namely, both the liquid crystal displays whose viewing angle characteristics are illustrated in FIG. 7 do not degrade display visual recognition even at a large angle, similar to the first comparative example whose viewing angle characteristics are illustrated by the curve a in FIG. 3. Moreover, as different from the first comparative example, both the liquid crystal displays are compatible with a large retardation Δnd of (630 nm, 825 nm).

It is therefore possible that these liquid crystal displays realize good display characteristics even in high duty driving.

Next, the present inventor has studied the case in which the first and second biaxial films 3c and 3d of the liquid crystal display of the embodiment have different optical parameters.

The viewing angle characteristics in the right/left direction of the liquid crystal display of the embodiment was analyzed by setting the retardation Δnd of the liquid crystal layer to 825 nm, setting both the thickness direction retardations Rth of the first and second negative biaxial films 3c and 3d to 300 nm, and setting different in-plane retardations Re to the first and second negative biaxial films 3c and 3d.

Figure 8:
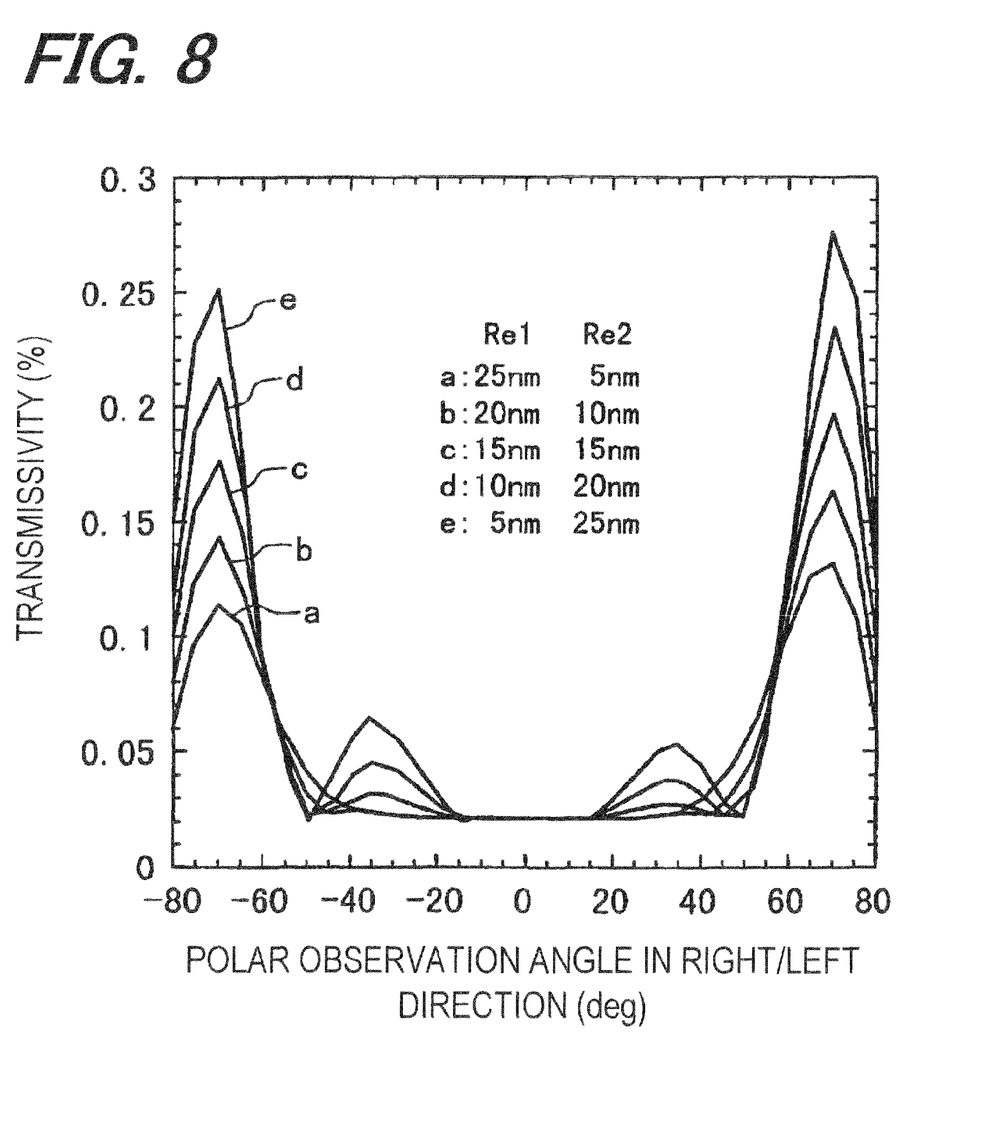
FIG. 8 is a graph illustrating analysis results of right/left direction viewing angle characteristics.

FIG. 8 is a graph illustrating analysis results of the viewing angle characteristics in the right/left direction.

The abscissa of the graph represents an observation angle in the right left direction in the unit of "°", and the ordinate represents an optical transmissivity in the unit of "%". The in-plane retardations of the first and second negative biaxial films 3c and 3d are represented by Re1 and Re2, respectively. Curves a, b, c, d and e indicate the viewing angle characteristics in the right/left direction at the in-plane retardations (Re1, Re2) of (25 nm, 5 nm), (20 nm, 10 nm), (15 nm, 15 nm), (10 nm, 20 nm) and (5 nm, 25 nm), respectively in this order.

In the case of Re1>Re2 (curves a and b), optical transmittance becomes large at an observation angle of 50° or larger. On the other hand, in the case of Re1<Re2 (curves d and e), optical transmittance becomes larger at an observation angle near 35° than in the case of Re1>Re2 (curves a and b). Optical transmittance becomes larger as the value of Re2−Re1 becomes larger. It can be understood from the results illustrated in FIG. 8 that if Re1≧Re2, background viewing angle characteristics can be widened.

Next, the present inventor has analyzed the viewing angle characteristics in the right/left direction of the liquid crystal display of the embodiment, by making the in-plane retardations Re of the first and second biaxial films 3c and 3d equal and setting different thickness direction retardations. For the analysis, the retardation Δnd of the liquid crystal layer was set to 630 nm, and the in-plane retardations Re of the first and second negative biaxial films 3c and 3d were set to 20 nm.

Figure 9:
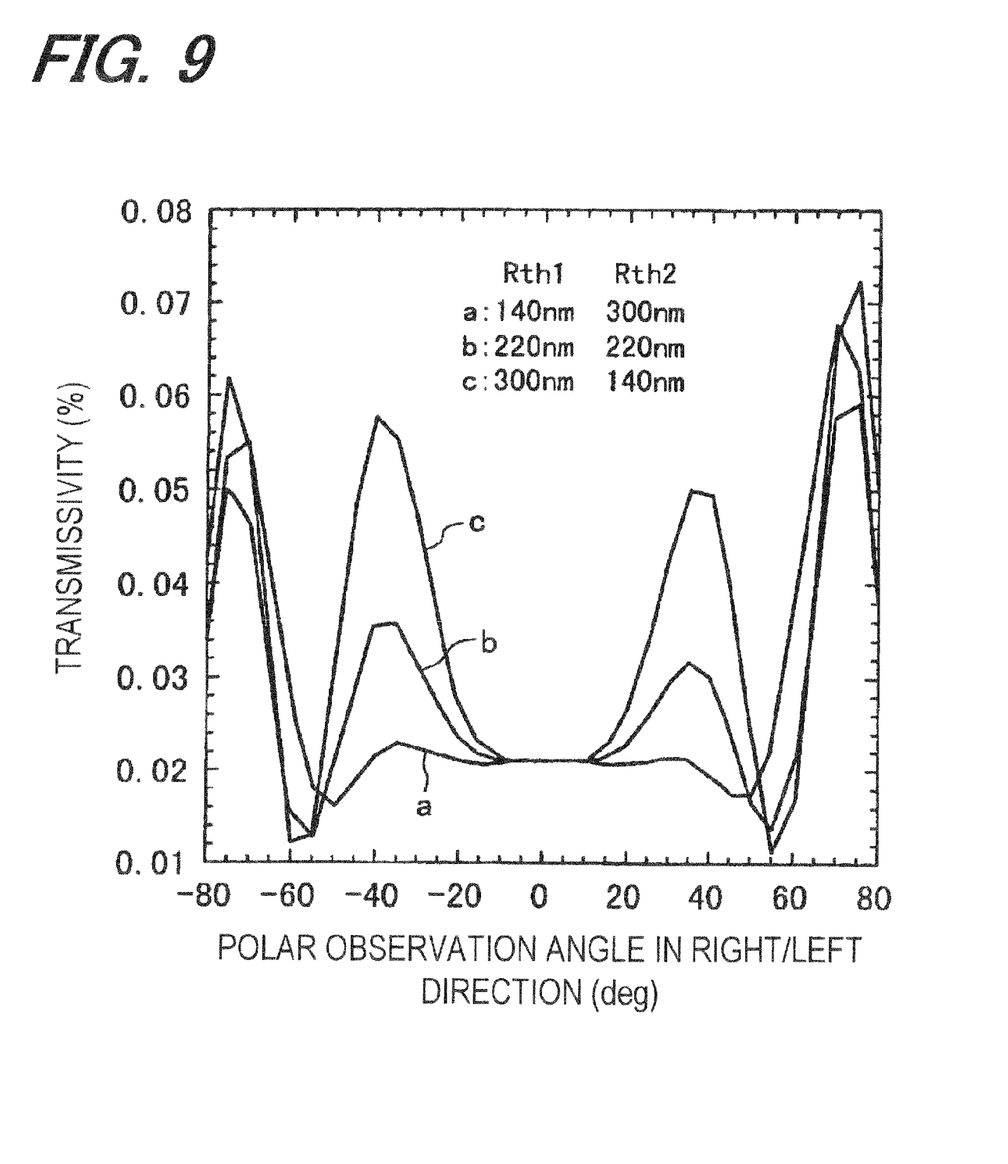
FIG. 9 is a graph illustrating analysis results of right/left direction viewing angle characteristics.

FIG. 9 is a graph illustrating analysis results of the viewing angle characteristics in the right/left direction.

The abscissa of the graph represents an observation angle in the right/left direction in the unit of "°", and the ordinate represents an optical transmissivity in the unit of "%". Thickness direction retardations of the first and second negative biaxial films 3c and 3d are represented by Rth1 and Rth2, respectively. Curves a, b and c indicate the viewing angle characteristics in the right left direction at the thickness direction retardations (Rth1, Rth2) of (140 nm, 300 nm), (220 nm, 220 nm) and (300 nm, 140 nm), respectively in this order.

The curves a to c indicate most remarkable differences near at an observation angle of 35°, and the curve c has largest optical transmittance at Rth (Rth1=300 nm, Rth2=140 nm) It can be understood that a range of Rth1≦Rth2 is preferable.

The liquid crystal display of the embodiment has been described above in which two negative biaxial films are laminated and disposed between the lower glass substrate 5 of the liquid crystal cell and the rear polarizer 20. It is expected that the viewing angle characteristics are improved even if two or more negative biaxial films are laminated and disposed between the glass substrate and polarizer The present inventor has studied a liquid crystal display (of a modification of the embodiment) disposing three negative biaxial films between the lower glass substrate 5 and rear polarizer 20 of the liquid crystal display of the embodiment.

The in-plane slow axes of three negative biaxial films were disposed approximately perpendicular (135° direction) to the absorption axis ab of the adjacent rear polarizer 20. The in-plane retardations Re and thickness direction retardations Rth of all negative biaxial films were made equal.

Figure 10:
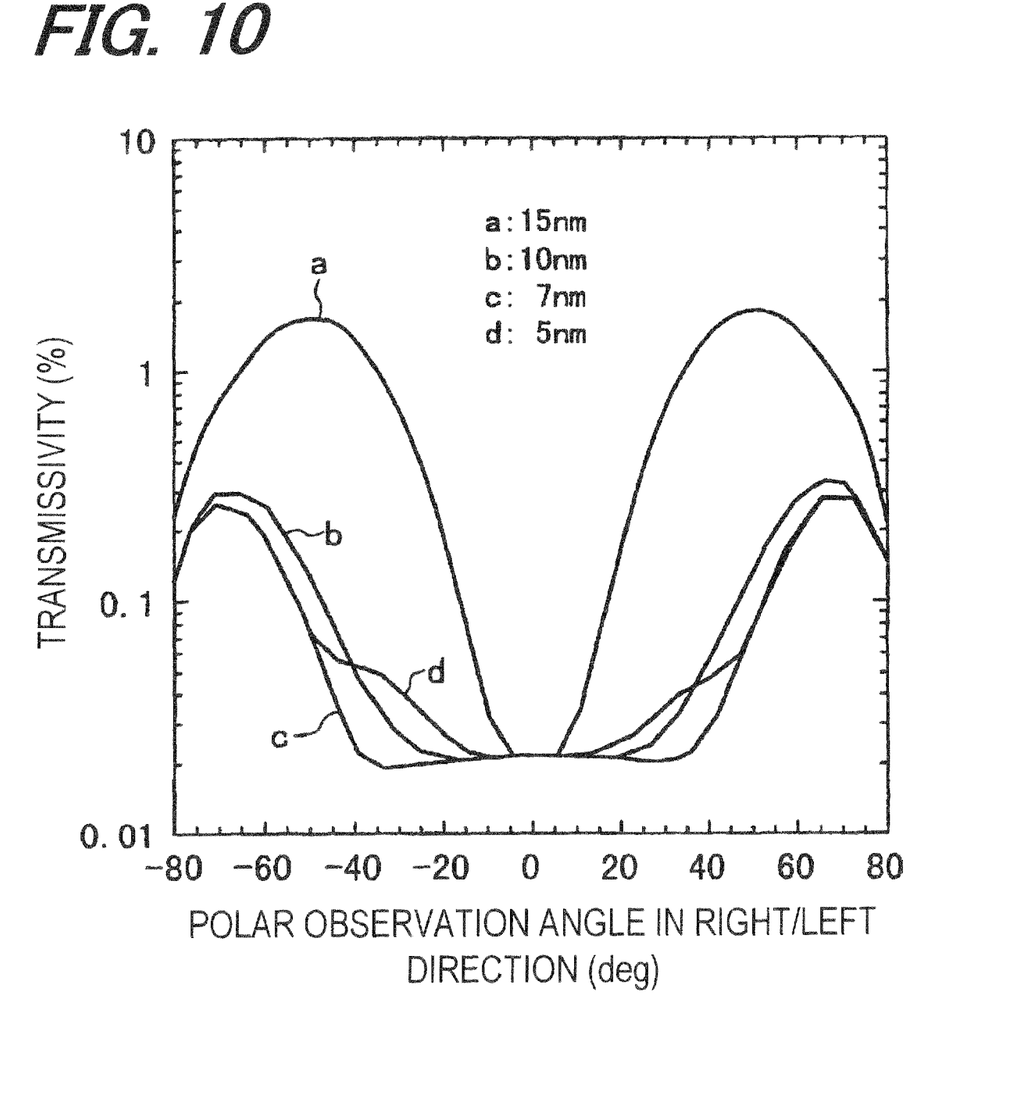
FIG. 10 is a graph illustrating an Re dependency of right/left direction viewing angle characteristics at a fixed retardation Δnd of 870 nm of the liquid crystal layer and a fixed retardation Rth of 220 nm in the thickness direction of each biaxial film.

FIG. 10 is a graph illustrating an Re dependency of the viewing angle characteristics in the right/left direction, when the liquid crystal layer retardation Δnd is set to 870 nm and the thickness direction retardation Rth of each biaxial film is fixed to 220 nm.

The abscissa of the graph represents an observation angle in the right/left direction in the unit of "°" and in a linear scale, and the ordinate represents an optical transmissivity in the unit of "%" and in a logarithmic scale. Curves a, b, c and d indicate the viewing angle characteristics in the right/left direction at the in-plane retardations Re of 15 nm, 10 nm, 7 nm and 5 nm, respectively in this order.

It can be recognized from the graph that the degree of optical transmittance changes with the value of the in-plane retardation, particularly at a large observation angle. It is seen that a value of the optimum in-plane retardation Re is 7 nm (curve c). As illustrated with reference to FIG. 5, a value of the optimum in-plane retardation is 15 nm with two negative biaxial films being inserted. It can be understood that an optimum in-plane retardation Re changes with the number of negative biaxial films.

However, as apparent from comparison between FIGS. 10 and 5, three inserted negative biaxial films (modification) provide a narrower range of an observation angle for obtaining good dark state than two inserted negative biaxial films (embodiment). A change in viewing angle characteristics becomes large relative to a change in in-plane retardation Re. It is therefore considered that the number of negative films to be inserted is preferably three or smaller, and most preferably two.

Even if the number of inserted negative biaxial films is three, it is expected that good viewing angle characteristics are obtained if the thickness direction retardation Rth of each negative biaxial film is in a range of 90 nm$\leq$Rth$\leq$350 nm and the inplane retardation Re is in a range of 5 nm$\leq$Re$\leq$30 nm. It can be considered that good display quality is obtained in high duty driving, e.g., at a duty of 1/16 or higher, if the ranges are 220 nm$\leq$Rth$\leq$350 nm and 5 nm$\leq$Re$\leq$25 nm, more preferably 7 nm<Re$\leq$20 nm.

Similar to the embodiment described with reference to FIG. 8, in order to realize good display, it is desired to set Re1$\geq$Re2$\geq$Re3 also for the modification, where the in-plane retardations Re of three negative biaxial films disposed between the lower glass substrate and rear polarizer are represented by Re1, Re2 and Re3 in the order nearer to the polarizer.

Similar to the embodiment described with reference to FIG. 9, in order to realize good display, it is desired to set Rth1$\leq$Rth2$\leq$Rth3 also for the modification, where the thickness direction retardations Rth of three negative biaxial films disposed between the lower glass substrate and rear polarizer are represented by Rth1, Rth2 and Rth3 in the order nearer to the polarizer.

Further, in the analysis results illustrated in FIG. 8, although a sum of in-plane retardations of two negative biaxial films is set to 30 nm, better display is expected to be realized by setting a sum of in-plane retardations of two negative biaxial films of the embodiment or three negative biaxial films of the modification larger than 20 nm to 60 nm or smaller.

Both the liquid crystal displays of the embodiment and modification are expected to realize good display if the liquid crystal layer retardation $\Delta$nd is in a range of 300 nm$\leq$$\Delta$nd$\leq$940 nm In a range of 500 nm$\leq$$\Delta$nd$\leq$940 nm, good display quality is expected even under the condition of high duty driving.

Although the present invention has been described in connection with the embodiment and modification, the present invention is not limited thereto.

Figure 11:
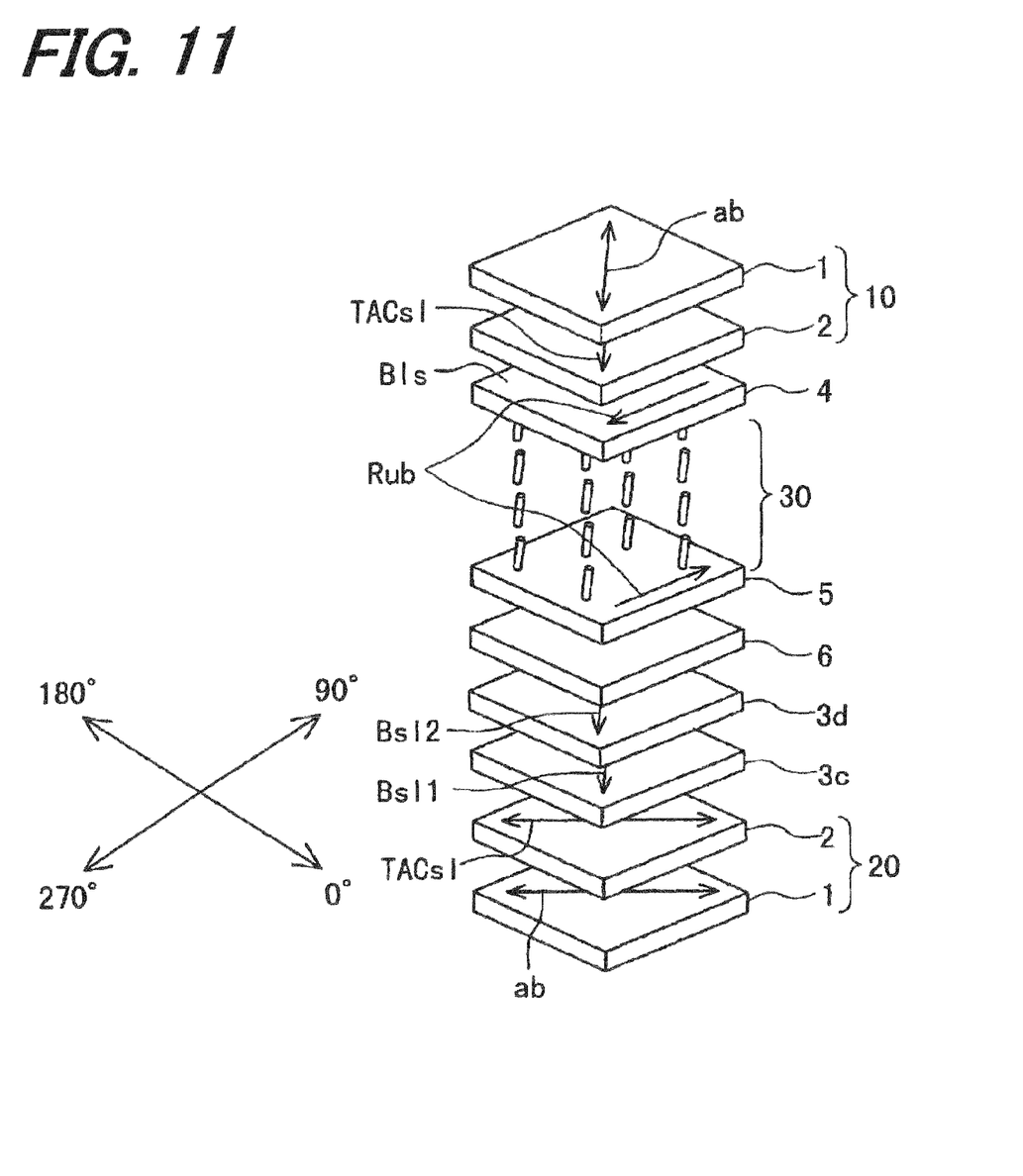
FIG. 11 is a schematic diagram illustrating a liquid crystal display according to a modification.

For example, although two or three negative biaxial films 3c and 3d are laminated and disposed between the lower glass substrate 5 and rear polarizer 20 of the embodiment and modification, a C plate 6 may further be inserted between the lower glass substrate 5 and adjacent negative biaxial film 3d as illustrated in FIG. 11.

Good viewing angle characteristics are obtained by inserting the C plate 6, even if the liquid crystal layer retardation $\Delta$nd is large. With this structure, a sum of thickness direction retardations Rth of all negative biaxial films and C plate is preferably set to 0.5 to 1 time the liquid crystal layer retardation $\Delta$nd.

It is obvious that various alterations, improvements, combinations and the like can be made by those skilled in the art.

The present invention is applicable to general liquid crystal displays. For example, the present invention is suitable for being applied to a multiplex drive liquid crystal display.

What are claimed are:

1. A liquid crystal display comprising:
   first and second transparent substrates;
   a liquid crystal layer squeezed between said first and second transparent substrates and vertically aligned at a retardation of 300 nm or larger to 940 nm or smaller;
   two or three viewing angle compensators disposed on said first transparent substrate on a side opposite to said liquid crystal layer, each of said viewing angle compensators having a retardation of 90 nm or larger to 350 nm or smaller in a thickness direction and a retardation of 5 nm or larger to 30 nm or smaller in an in-plane direction;
   a first polarizer disposed on said two or three viewing angle compensator on a side opposite to said first transparent substrate; and
   a second polarizer disposed on said second transparent substrate on a side opposite to said liquid crystal layer and crossed-Nichol disposed relative to said first polarizer;
   wherein an in-plane slow axis of each of said viewing angle compensators is disposed perpendicular to an absorption axis of said first polarizer.

2. The liquid crystal display according to claim 1, wherein:
   the retardation of said liquid crystal layer is 500 nm or larger to 940 nm or smaller;
   each of said viewing angle compensators has a retardation of 220 nm or larger to 350 nm or smaller in the thickness direction and a retardation of 5 nm or larger to 25 nm or smaller in the in-plane direction.

3. The liquid crystal display according to claim 1, wherein each of said viewing angle compensators has a retardation larger than 7 nm and 20 nm or smaller in the in-plane direction.

4. The liquid crystal display according to claim 1, wherein a sum of retardations in the in-plane direction of said two or three viewing angle compensators is larger than 20 nm to 60 nm or smaller.

5. The liquid crystal display according to claim 1, wherein:
   said two or three viewing angle compensators includes a first viewing angle compensator and a second viewing angle compensator disposed nearer to said first transparent substrate than said first viewing angle compensator; and
   said first viewing angle compensator has a retardation in the in-plane direction larger than said second viewing angle compensator.

6. The liquid crystal display according to claim 1, wherein said first viewing angle compensator has a retardation in the thickness direction smaller than said second viewing angle compensator.

7. The liquid crystal display according to claim 1, wherein a C plate is inserted between said first transparent substrate and said two or three viewing angle compensators.

* * * * *